United States Patent
Moltzheim et al.

(10) Patent No.: US 6,557,627 B2
(45) Date of Patent: May 6, 2003

(54) BLOW-MOLDED RADIATOR FAN CARRIER

(75) Inventors: Jurgen Moltzheim, Konigswinter (DE); Axel Birk, Linz (DE); Malcom Claydon, Warcester (GB)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 10/138,629

(22) Filed: May 3, 2002

(65) Prior Publication Data

US 2002/0189797 A1 Dec. 19, 2002

(30) Foreign Application Priority Data

May 3, 2001 (DE) .......................... 101 21 595
Jul. 5, 2001 (DE) .......................... 101 32 602

(51) Int. Cl.[7] .............................................. F24H 3/02
(52) U.S. Cl. .................... 165/121; 165/41; 165/122; 180/68.1; 123/41.49
(58) Field of Search .............................. 165/41, 42, 43, 165/121, 122; 123/41.49; 180/68.1

(56) References Cited

U.S. PATENT DOCUMENTS

| | | | | |
|---|---|---|---|---|
| 3,692,004 A | * | 9/1972 | Tangue et al. ........... | 123/41.49 |
| 3,833,054 A | * | 9/1974 | Gross et al. .................. | 165/67 |
| 4,709,757 A | * | 12/1987 | Bly ............................. | 165/173 |
| 4,947,931 A | * | 8/1990 | Vitacco ...................... | 165/148 |
| 5,107,924 A | * | 4/1992 | Herbert et al. .............. | 165/173 |
| 5,649,587 A | | 7/1997 | Plant ........................... | 165/41 |
| 5,671,803 A | * | 9/1997 | Tepas et al. .................. | 165/41 |
| 6,155,335 A | * | 12/2000 | Acre et al. .................... | 165/41 |

* cited by examiner

Primary Examiner—Henry Bennett
Assistant Examiner—Terrell McKinnon
(74) Attorney, Agent, or Firm—Grossman, Tucker, Perreault & Pfleger PLLC

(57) ABSTRACT

A blow-molded plastic carrier for a motor vehicle radiator fan has at least one opening for cooling air to pass therethrough, means for fixing at least one fan thereto and at least one integrated liquid container or the like. The carrier has a preferably metal reinforcing insert around which the plastic material of the carrier is molded and at least partially penetrates therethrough. The reinforcing insert has fixing means for fixing the carrier in position and for mounting further functional components thereto.

10 Claims, 5 Drawing Sheets

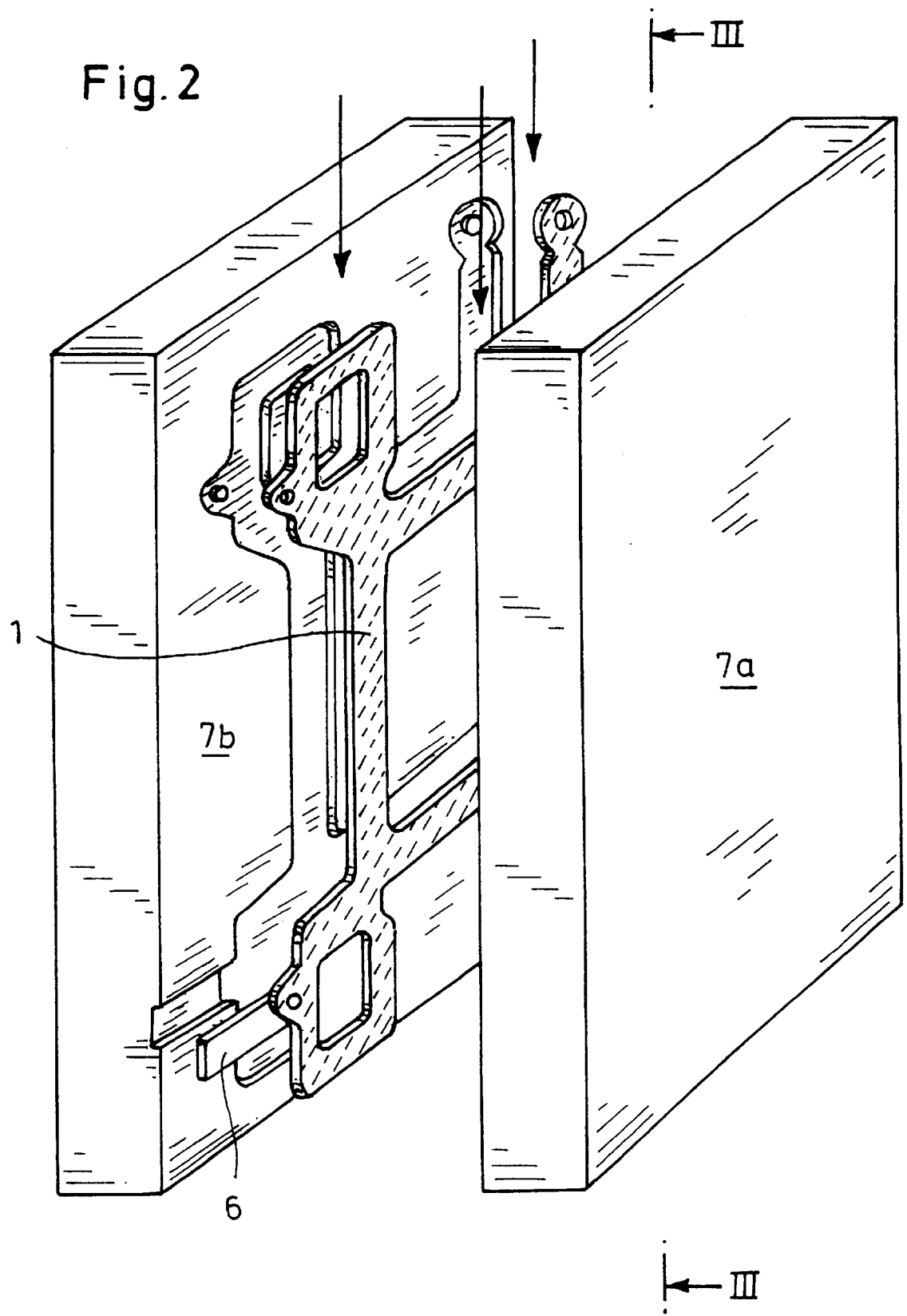

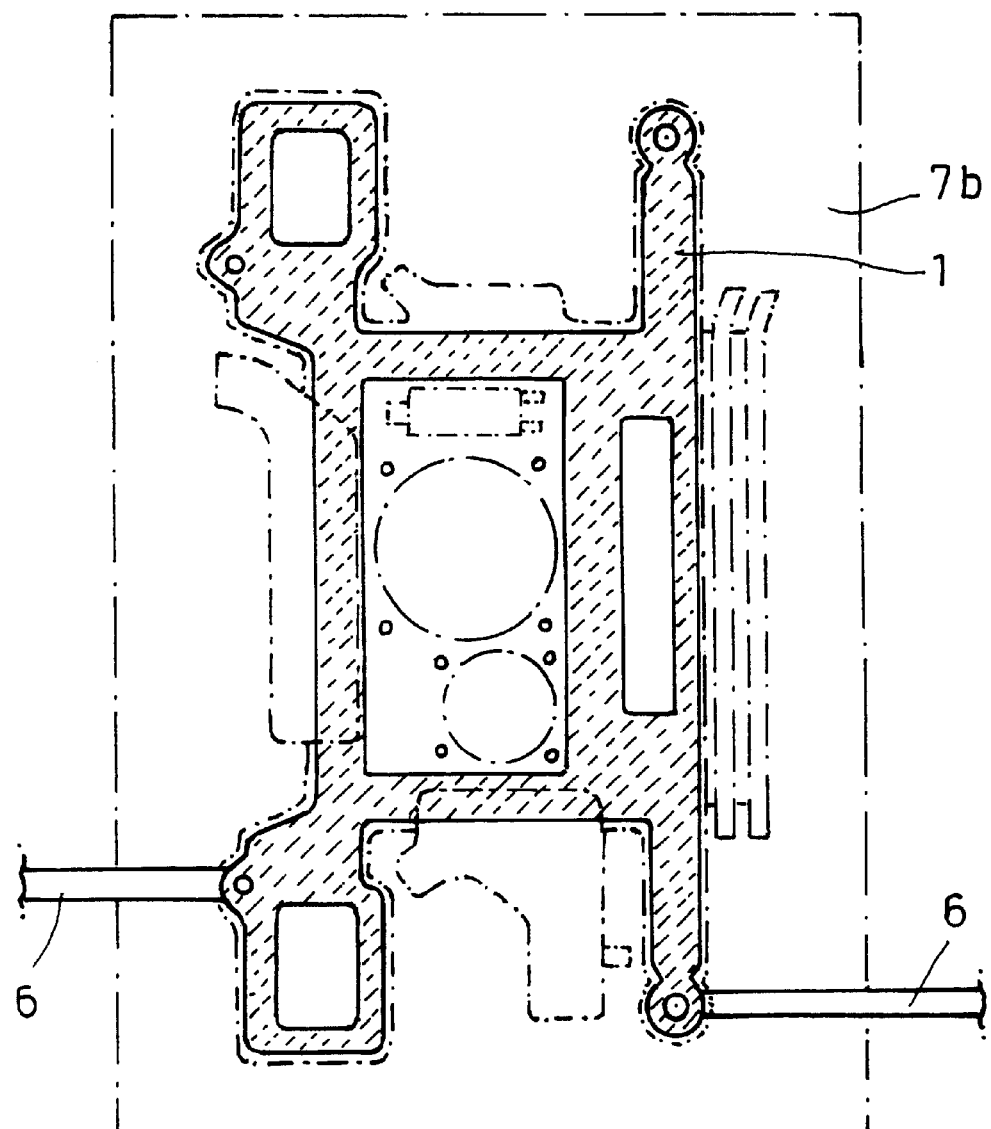

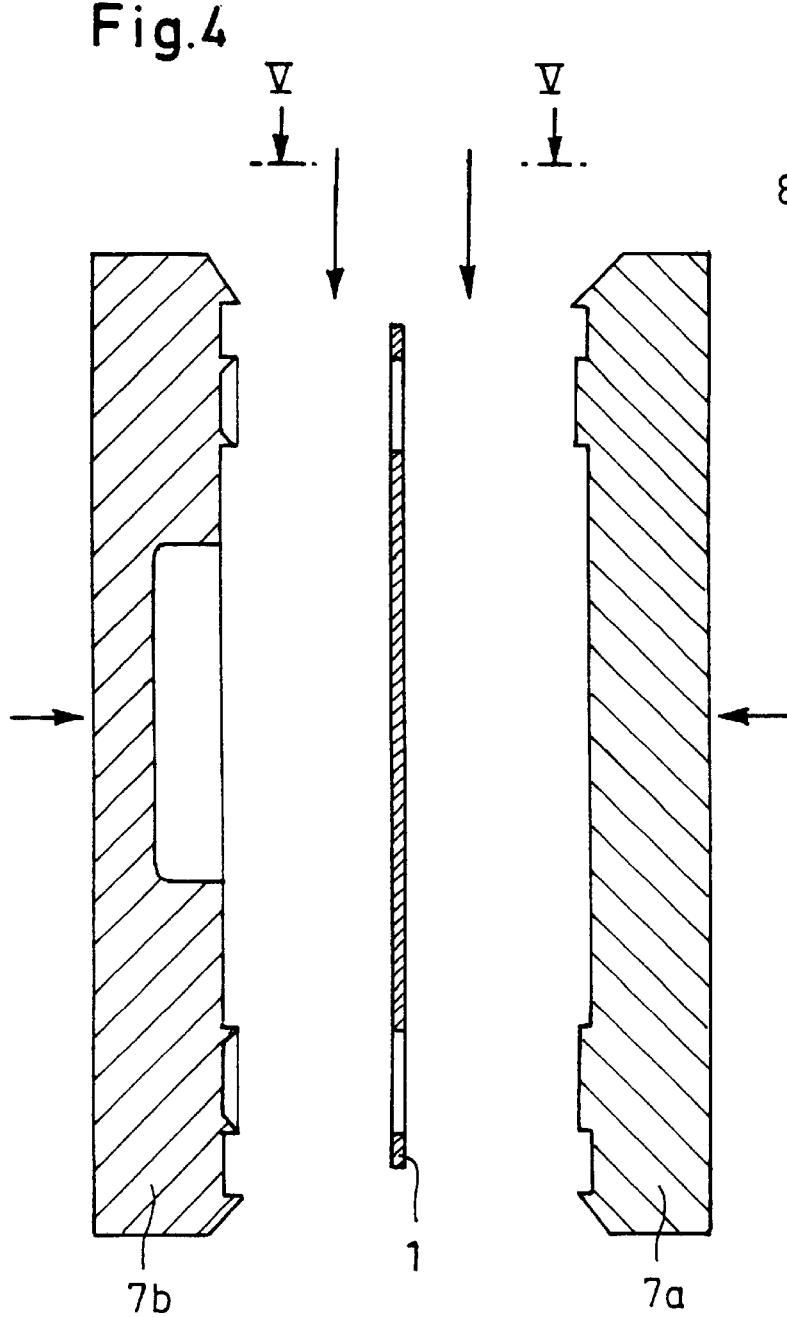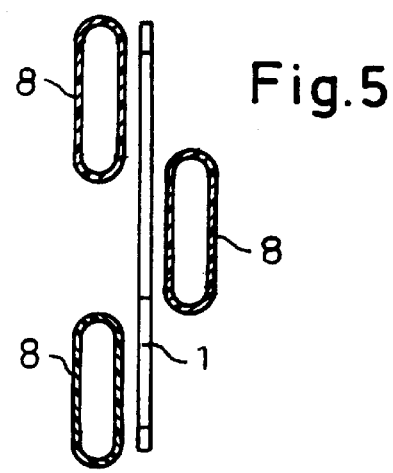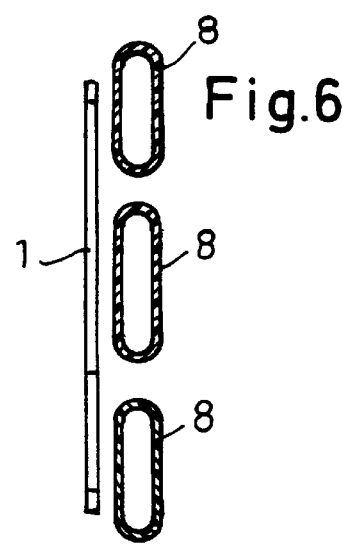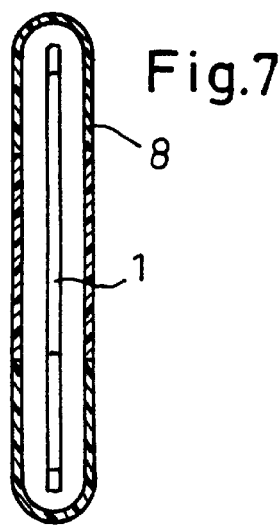

BLOW-MOLDED RADIATOR FAN CARRIER

FIELD OF USE

The present invention concerns a blow-molded radiator fan carrier and more particularly a blow-molded carrier of plastic material for a motor vehicle radiator fan.

BACKGROUND OF THE INVENTION

One form of plastic carrier for a motor vehicle radiator fan comprises at least one opening for cooling air to pass therethrough, with means for mounting at least one fan to the carrier, and at least one integrated liquid container. Such a carrier for a motor vehicle radiator fan is to be found for example in U.S. Pat. No. 5,649,587. One of the advantages of that blow-molded carrier is that various functionalities can be combined in one component by virtue of the fact that the carrier is of an integral double-wall configuration produced by extrusion blow molding. Thus for example a coolant container, a wiper water container and the like can be integrated into the carrier which forms a housing for one or possibly more fans.

The double-wall configuration of that carrier, in the form of an extrusion blow-molded component, also means that the carrier enjoys sufficient strength and stability.

It will be noted that increasing value is laid nowadays in the production of motor vehicles on components which involve a high degree of integration, for the purposes of simplifying assembly procedures. An endeavour in this respect is therefore to combine as many functionalities as reasonably possible in one unit.

SUMMARY OF THE INVENTION

An object of the present invention is to provide a blow-molded plastic carrier for a motor vehicle radiator fan which enjoys enhanced functionality options and improved integratability.

Another object of the present invention is to provide a plastic blow-molded carrier for a radiator fan which affords versatility of use in terms of accommodating further components in a more rational structural arrangement.

Still another object of the present invention is to provide a plastic extrusion blow molding which can be used not only for accommodating a cooling fan unit but also a plurality of other motor vehicle components.

In accordance with the principles of the present invention the foregoing and other objects are attained by a blow-molded plastic carrier, for a motor vehicle radiator fan, comprising at least one passage therethrough for cooling air, means for fixing at least one fan to the carrier, and at least one integrated liquid container or the like. The carrier has at least one reinforcing insert which can preferably be of metal. The plastic material of the carrier is molded around the reinforcing insert and at least partially penetrates therethrough. The reinforcing insert is provided with fixing means for mounting the carrier and for receiving further functional components.

It will be noted in this respect that the term blow molding in accordance with the invention is generally used herein to denote extrusion blow molding.

As will be apparent from a description hereinafter of a preferred embodiment of the invention, by means of the structural configuration of the carrier according to the invention it is possible for the carrier to be designed in the form of what is referred to as a front end module which for example can be provided with an air conditioning assembly radiator mounting, air supply ducts, inlet resonators, a coolant compensating reservoir, a screen washer reservoir, a headlamp cleaning reservoir, an oil cooler mounting, a main fan mounting, a radiator mounting, a coolant pipe with quick-action connectors, condensate collecting tanks and the like. The preferably metal reinforcing insert can be provided with suitable fixing means for fixing to the vehicle bodywork.

In a preferred feature of the invention the reinforcing insert has at least two headlamp mountings for receiving headlamps.

All components and in particular all functional components such as for example a screen washer reservoir, a coolant compensating reservoir and the like can be in the form of an integral constituent part of the carrier. They are desirably produced with the carrier in one working operation by extrusion blow molding from one or more preforms which are extruded in tubular form.

The plastic functional components can be obtained by wall-to-wall welds of at least one preform which is extruded in tubular form. Embossing configurations or wall-to-wall welds can also be provided for reinforcing or stiffening purposes.

Depending on the functionality of the individual plastic components and containers involved, the carrier can be composed of various plastic materials. It may for example be desirable for regions of the carrier which in the mounted condition are arranged near the underbody or floorpan of the motor vehicle to be made from particularly impact-resistant plastic material.

The arrangement of various functional components comprising different plastic materials, as an integral constituent part of the carrier, can for example be achieved by the carrier being produced from a plurality of preforms which are extruded in a tubular configuration into a common mold. Alternatively or in addition it is possible to achieve a different composition of material in respect of various functional components from one preform, by virtue of sequential extrusion of different materials.

In a preferred feature of the invention the reinforcing insert can be in the form of a pre-stamped and/or at least partially pre-shaped steel plate or sheet.

It may be particularly advantageous if the reinforcing insert was permanently deformed upon closure of the blow molding portions, by virtue of the closing pressure thereof. This has the advantage that one working step is saved, in regard to manufacture of the reinforcing insert.

It will be apparent to the man skilled in the art that the reinforcing insert does not necessarily have to comprise steel plate or sheet, but on the contrary it can also be made from injection-molded plastic material, glass fiber reinforced plastic or a thermosetting plastic material.

The manner of manufacture involved, that is to say by blow molding the plastic material around an insert, for example a steel plate or sheet, provides that the materials are intimately joined or anchored to each other so that the result achieved overall is a multifunctional and in particular stable component which affords a high degree of integration.

Further objects, features and advantages of the invention will be apparent from the description hereinafter of a preferred embodiment.

BRIEF DESCRIPTION OF THE DRAWING

FIG. 2 shows two blow molding halves in the opened condition, with a steel sheet frame inserted therebetween, FIG. 3 is a view in the direction of the arrows III—III in FIG. 2, FIG. 4 shows a view in section taken along lines IV—IV in FIG. 3, FIGS. 5, 6 and 7 are diagrammatic views of the arrangements of a preform or preforms with respect to a steel sheet frame held between the mold halves.

DESCRIPTION OF THE PREFERRED EMBODIMENT

Figure 1:
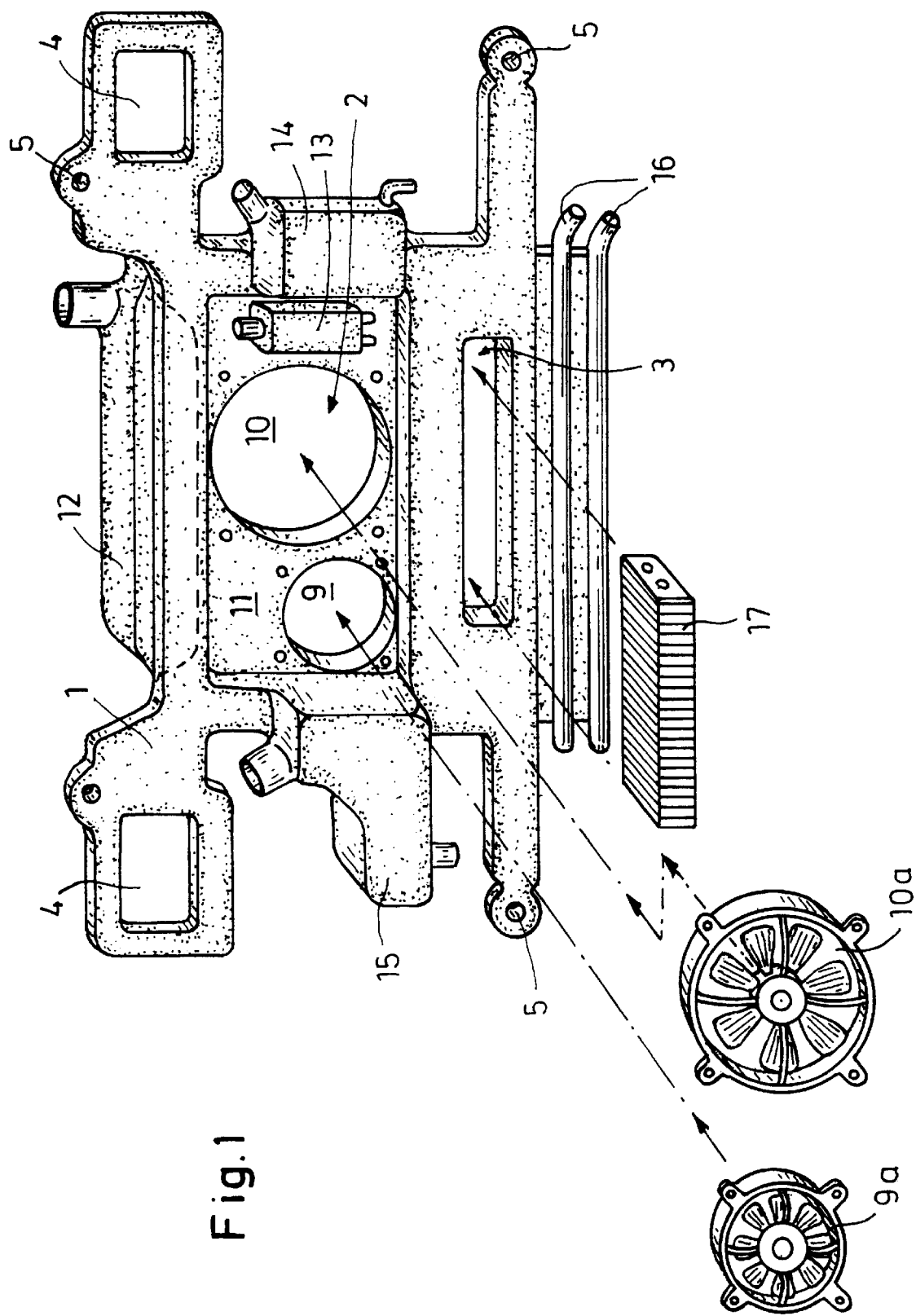
FIG. 1 shows a perspective view of the carrier.
Figure 8:
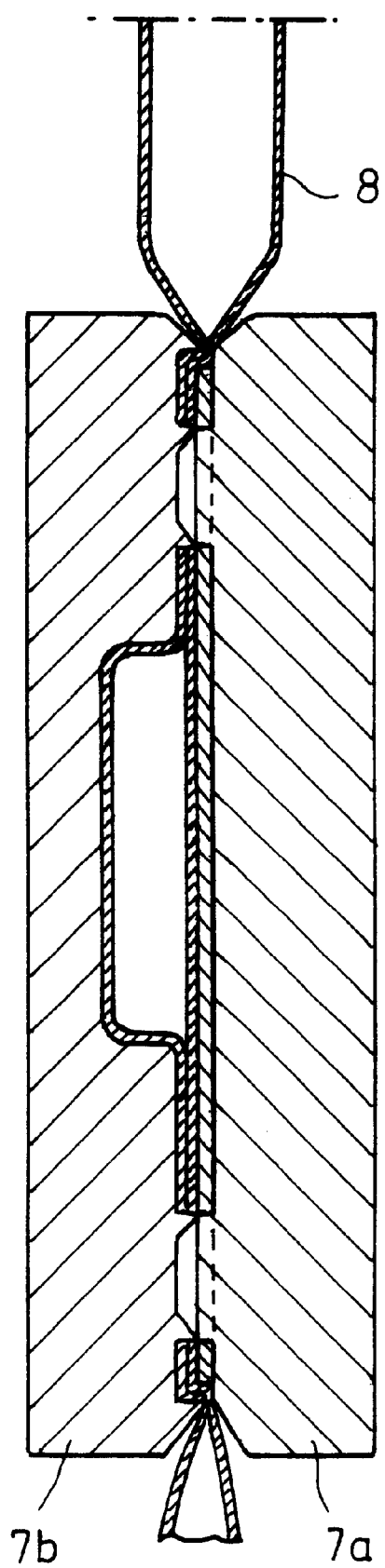
FIG. 8 is a view in section corresponding to the section shown in FIG. 5 with the mold halves in the condition of having been brought together.

Referring firstly to FIG. 1, shown in the perspective view therein is a blow-molded carrier for a motor vehicle radiator fan in the form of a front-end module for arrangement between a radiator grill and a radiator of a motor vehicle. The carrier includes a steel sheet frame which is generally identified by reference numeral 1 and which includes a central opening 2 therethrough and a further opening 3 which in the normal position of installation of the carrier is in the lower portion thereof, headlamp mountings 4 and two fixing eyes 5 for mounting to the motor vehicle body. The frame 1 forms a load-bearing composite with various plastic portions which were obtained by extrusion blow molding and which are involved in an intimate join or anchoring effect with the steel frame, partially penetrating therethrough.

Looking now also at FIGS. 2 through 8, to produce the carrier in accordance with the invention, a pre-stamped steel sheet frame 1 is positioned by means of two holding elements 6 between mold halves 7a, 7b which between them define a mold cavity (shown but not referenced).

Depending on the respective configuration of the finished component, one or more molten tubular preforms is or are extruded from one or more extrusion heads (not shown) arranged above the mold halves. The one or more preforms are expanded under internal pressure by means of expansion air within the closed blow molding halves 7a, 7b in the usual manner and when they set fill the mold cavity.

The procedure involved in extrusion blow molding in that way has long been known so that it will not be described in detail herein.

In the simplest variant of the carrier in accordance with the invention, as illustrated by way of indication in FIG. 7, a single tubular preform is extruded in a hanging position, more specifically in such a way that the steel sheet frame which is freely positioned between the mold halves 7a, 7b is enclosed by the preform 8. When now the mold halves 7a, 7b are brought together under the effect of a force acting on at least one thereof, so that the preform is squeezed together along the external contours of the mold cavity and the portions of the preform outside the external contours of the mold cavity are separated by the squeezing effect from the part of the preform within the mold cavity, thereby forming a peripherally extending bulge therearound, the steel frame 1 is completely encased by the plastic material and the plastic material passes therethrough to a greater or lesser degree, depending on the respective configuration of the mold cavity. That step results in a plastic-metal composite component with a high level of stability. Different compositions of material of the plastic, for example over the height of the mold shown in FIG. 4, can be achieved in extrusion procedures using one preform 8, by virtue of the sequential extrusion of different plastic materials.

Reference will now be made to FIGS. 5, 6 and 7 diagrammatically showing various alternative procedures for production of the carrier according to the invention. With the operating procedures diagrammatically shown in FIGS. 5 and 6, a total of three tubular preforms 8 are extruded between the blow molding halves 7a, 7b. They can be arranged either at one side of the steel frame, as shown in FIG. 6, or on respective sides of the steel frame, as shown in FIG. 5. In that way for example thermoplastic materials involving different compositions of material can be simultaneously extruded between the mold halves 7a, 7b. A component which is comparatively complex, as shown in FIG. 1, involving a high level of functionality, can be produced by virtue of wall-to-wall welds and suitably directing the blow molding air.

The specific embodiment of the invention as described herein has in the central portion two fan mounting portions as indicated diagrammatically at 9 and 10 for a main fan 10a and an air conditioning arrangement fan 9a. The fan mountings 9, 10 are provided in a filling portion 11 in the central opening 2 through the carrier. The portion 11 is of a double-wall configuration in the region of the fan mountings 9, 10. The wall regions of the preform 8 in question, which thus bear against each other, have been welded together in that region. It is possible for ribs or similar profile configurations also to be provided here for stiffening purposes.

Provided above the fan mountings 9, 10 is an inlet air guide means 12 with resonator comprising polypropylene. Reference numeral 13 denotes a coolant compensating tank or reservoir, reference numeral 14 denotes a washing liquid reservoir and reference numeral 15 denotes a condensate collecting reservoir. Considered from top to bottom, in the position of installation, HDPE or PP (high density polyethylene or polypropylene) can be used for example to provide the reservoirs 13, 14, 15 which are arranged at the level of the central opening 2, and the portion 11. The region arranged thereabove, comprising the resonator 12, can be formed for example from polypropylene whereas coolant conduits 16 arranged beneath the lower opening 3 can be made from polyamide or like harder plastic material.

In the illustrated embodiment, the lower opening 3 receives an oil cooler as indicated at 17 which, like the air conditioning arrangement fan 9a and the main fan 10a was fitted in position after the carrier was finished.

The above-described configuration can be produced for example by the extrusion of three preforms 8 from polypropylene, polyethylene and polyamide respectively, as is shown in FIG. 6. All three portions, from the headlamp mountings 4 by way of the central opening 2 or cooling air passage to the subjacent coolant conduits 16, can be respectively produced by the extrusion of different preforms into one extrusion blow-molding mold. That then respectively results in a plurality of interconnected hollow bodies which are delimited by the mold wall, with hollow spaces which are at least partially closed in themselves and which have partially extended around and partially penetrated through the steel frame 1 positioned in the mold. As already indicated above, the containers or reservoirs or other functional components disposed on the steel frame can also be provided with wall-to-wall welds or embossing portions in order to form individual container or reservoir portions which are closed in themselves, involving different functions.

It is also possible in accordance with the principles of this invention to position a plurality of components of plate or sheet in the mold. Those plates or sheets can be arranged in the pressed region and thus form the steel frame for reinforcing the carrier.

It will be appreciated that the above-described embodiment of the invention has been set forth solely by way of example and illustration of the principles thereof and that various other modifications and alterations may be made therein without thereby departing from the spirit and scope of the invention.

What is claimed is:

1. A blow-molded plastic carrier for a motor vehicle radiator fan comprising at least one cooling air passage therethrough, means for fixing at least one fan thereto, at least one integrated liquid container, and at least one reinforcing insert in the carrier, the plastic material of the carrier surrounding the reinforcing insert and at least partially penetrating therethrough, the reinforcing insert further including fixing means for mounting the carrier in position and for receiving further functional components.

2. A carrier as set forth in claim 1 wherein the reinforcing insert comprises metal.

3. A carrier as set forth in claim 1 wherein the reinforcing insert forms at least first and second headlamp mounting means.

4. A carrier as set forth in claim 1 wherein the functional components comprise plastic material and are an integral constituent part of the carrier and were produced with the carrier in one working operation from at least one preform.

5. A carrier as set forth in claim 1 wherein the functional components comprise plastic material and were produced by wall-to-wall welding of at least one tubular extruded preform.

6. A carrier as set forth in claim 1 which is composed of different plastic materials.

7. A carrier as set forth in claim 1 which was obtained from a plurality of preforms extruded in tubular configuration into a common mold.

8. A carrier as set forth in claim 1 wherein the reinforcing insert is in the form of a pre-stamped steel sheet frame.

9. A carrier as set forth in claim 1 wherein the reinforcing insert is in the form of an at least partially pre-shaped steel sheet frame.

10. A carrier as set forth in claim 1 wherein the reinforcing insert was permanently deformed upon closure of the blow-molding mold halves for blow-molding of the plastic material of the carrier therearound.

* * * * *